(12) United States Patent
Fukumura et al.

(10) Patent No.: US 9,096,720 B2
(45) Date of Patent: Aug. 4, 2015

(54) METHODS FOR PRODUCING POLYASPARTIC ACID PRECURSOR POLYMER AND POLYASPARTIC ACID SALT

(75) Inventors: Kouki Fukumura, Kurume (JP); Hironori Kuboi, Ogori (JP); Keiichi Fukuda, Omuta (JP)

(73) Assignee: MITSUI CHEMICALS, INC., Tokyo (JP)

( * ) Notice: Subject to any disclaimer, the term of this patent is extended or adjusted under 35 U.S.C. 154(b) by 436 days.

(21) Appl. No.: 13/579,335

(22) PCT Filed: Feb. 10, 2011

(86) PCT No.: PCT/JP2011/052858
§ 371 (c)(1),
(2), (4) Date: Aug. 16, 2012

(87) PCT Pub. No.: WO2011/102293
PCT Pub. Date: Aug. 25, 2011

(65) Prior Publication Data
US 2012/0309909 A1    Dec. 6, 2012

(30) Foreign Application Priority Data

Feb. 18, 2010 (JP) ................................. 2010-033542

(51) Int. Cl.
| | | |
|---|---|---|
| *C08G 69/08* | (2006.01) | |
| *C08G 69/48* | (2006.01) | |
| *C07C 229/22* | (2006.01) | |
| *C08G 73/10* | (2006.01) | |

(52) U.S. Cl.
CPC ................... *C08G 73/1092* (2013.01)

(58) Field of Classification Search
USPC .................. 526/304; 525/420; 528/288, 310; 562/553
See application file for complete search history.

(56) References Cited

U.S. PATENT DOCUMENTS

| | | | |
|---|---|---|---|
| 2,486,370 A * | 10/1949 | Kenyon et al. ................. | 526/304 |
| 2,980,701 A | 4/1961 | Sauers et al. | |
| 4,839,461 A * | 6/1989 | Boehmke ....................... | 528/363 |
| 5,057,597 A | 10/1991 | Koskan | |
| 5,393,868 A | 2/1995 | Freeman et al. | |
| 5,548,036 A * | 8/1996 | Kroner et al. ................. | 525/419 |
| 5,612,447 A | 3/1997 | Freeman et al. | |
| 5,739,393 A | 4/1998 | Wagner et al. | |
| 5,962,400 A | 10/1999 | Thomaides et al. | |

FOREIGN PATENT DOCUMENTS

| | | |
|---|---|---|
| JP | 49-35325 A | 4/1974 |
| JP | 63-255261 A | 10/1988 |
| JP | 6-145350 A | 5/1994 |
| JP | 9-309952 A | 12/1997 |
| JP | 2000-212277 A | 8/2000 |
| JP | 2000-290368 A | 10/2000 |
| JP | 2000-517367 A | 12/2000 |
| JP | 3178955 B2 | 6/2001 |
| JP | 2003-26802 A | 1/2003 |
| JP | 3384420 B2 | 3/2003 |
| JP | 3385587 B2 | 3/2003 |
| JP | 3419067 B2 | 6/2003 |
| JP | 3431154 B2 | 7/2003 |
| JP | 3683064 B2 | 8/2005 |

OTHER PUBLICATIONS

International Search Report (PCT/ISA/210) issued on Apr. 19, 2011, by the Japanese Patent Office as the International Searching Authority for International Application No. PCT/JP2011/052858.
Written Opinion (PCT/ISA/237) issued on Apr. 19, 2011, by the Japanese Patent Office as the International Searching Authority for International Application No. PCT/JP2011/052858.
Extended European Search Report dated Sep. 11, 2013, issued by the European Patent Office in corresponding European Patent Application No. 11744580.9-1306/2537876 (5 pgs.).
Database WPI, Week 198848 & JP S63255261A.

* cited by examiner

*Primary Examiner* — Ling Choi
*Assistant Examiner* — Chun-Cheng Wang
(74) *Attorney, Agent, or Firm* — Buchanan, Ingersoll & Rooney PC

(57) ABSTRACT

Disclosed are a method for producing a polyaspartic acid precursor polymer by polymerization using at least one kind selected from a product obtained from maleic anhydride and ammonia and, maleamic acid as a monomer, wherein at least part of carboxyl groups in the monomers are a tertiary amine salt; and an industrially inexpensive and simple method for producing a polyaspartic acid salt by treating the polyaspartic acid precursor polymer obtained by this method with a basic aqueous solution.

12 Claims, 9 Drawing Sheets

F I G. 1
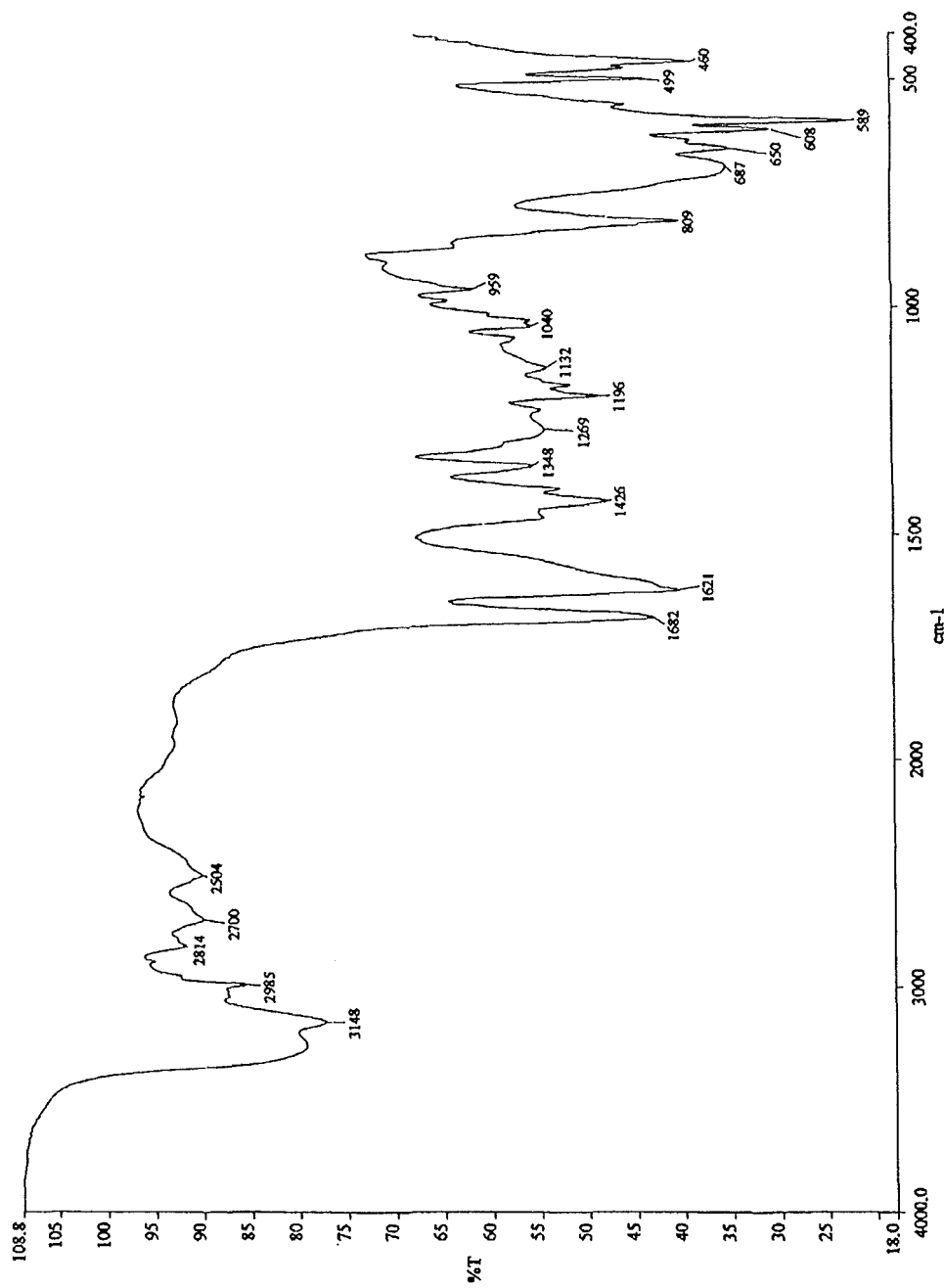

F I G. 4
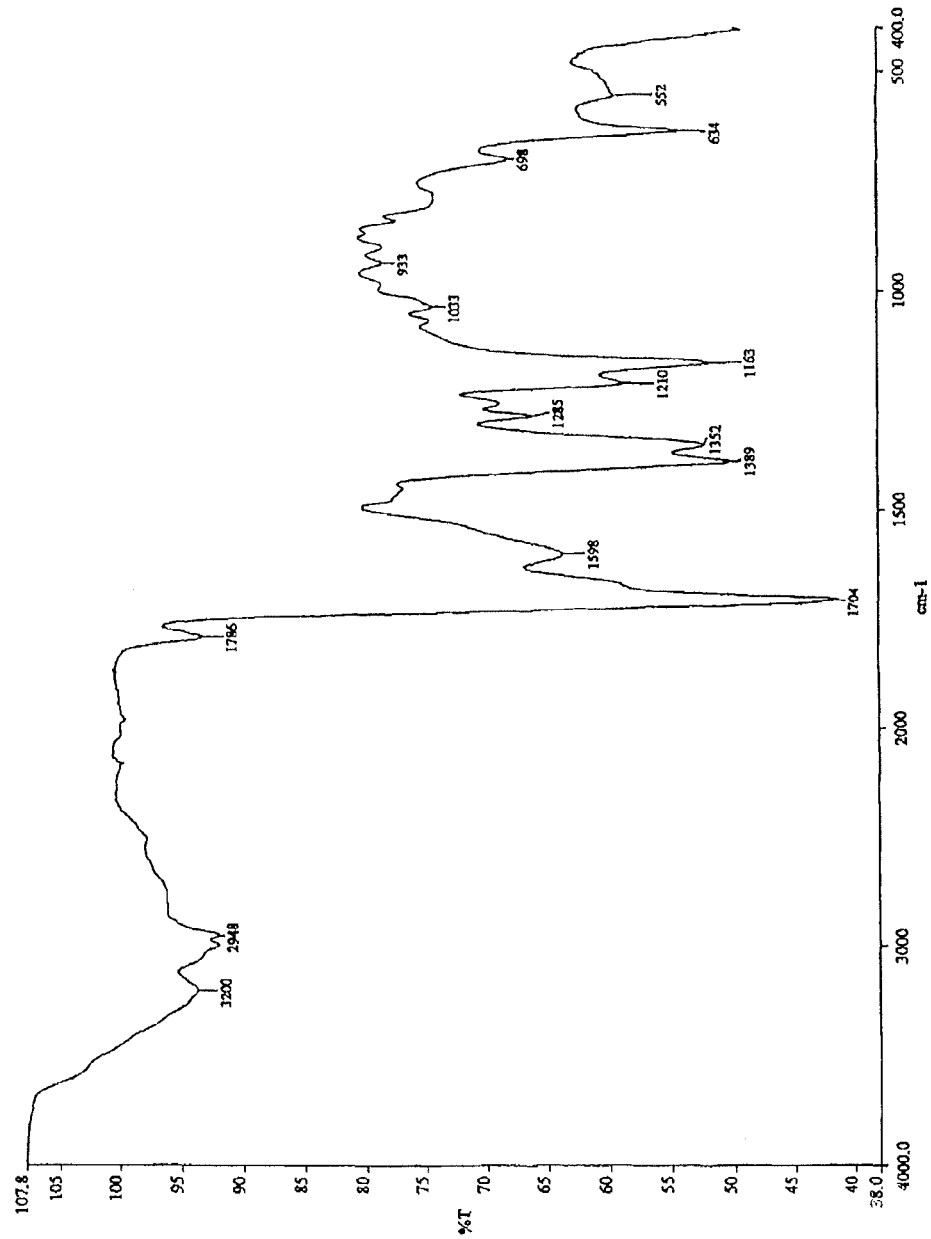

F I G. 6
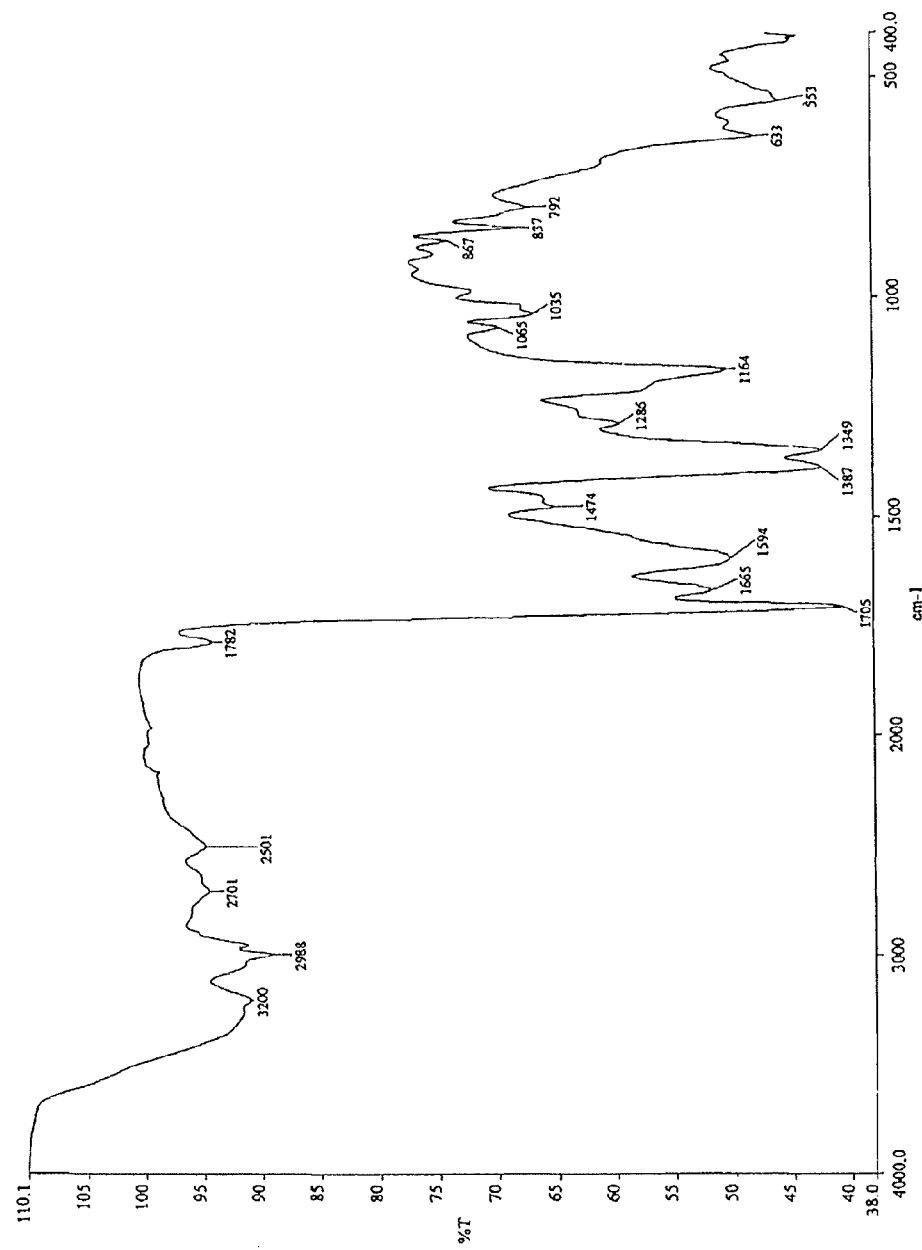

F I G. 8
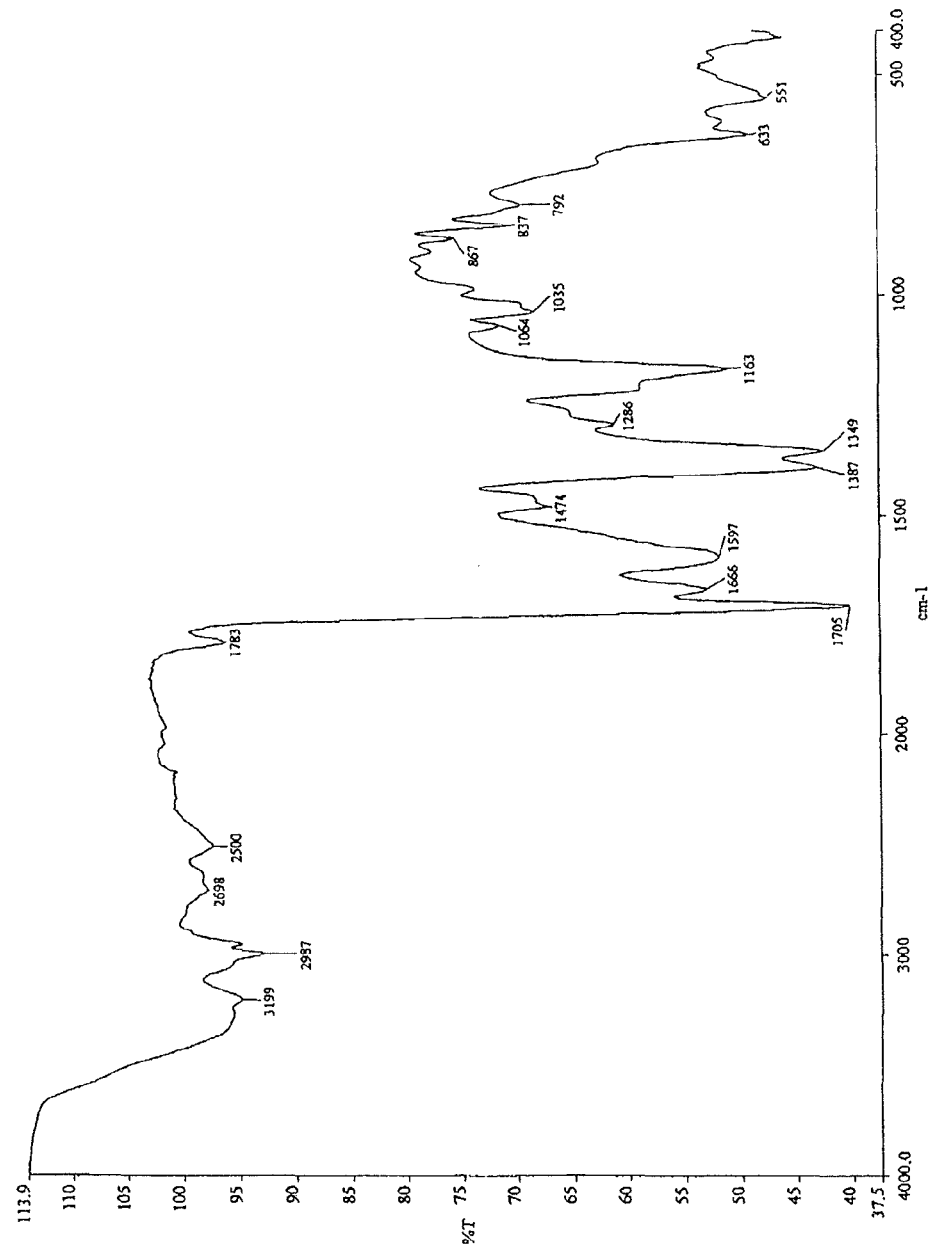

METHODS FOR PRODUCING POLYASPARTIC ACID PRECURSOR POLYMER AND POLYASPARTIC ACID SALT

TECHNICAL FIELD

The present invention relates to a method for producing a polyaspartic acid precursor polymer which is useful for producing a polyaspartic acid salt, and a method for producing a polyaspartic acid salt using it. The polyaspartic acid salt produced by the present invention is useful for various purposes such as a chelating agent, a scale inhibitor, a detergent builder, a dispersing agent, and a fertilizer additive.

BACKGROUND ART

Polyaspartic acids and salts thereof are known as an environmentally-adapted biodegradable water-soluble polymer, and are expected to be an alternative as a chelating agent, a scale inhibitor, a detergent builder, and a dispersing agent, and a fertilizer additive for industrial use. Also, for agriculture use, it is known that they have an advantageous effect as a crop growth promoter by mixing it to a fertilizer, as well as a value as an insecticide or a sterilizer is also recognized.

As a method for producing a polyaspartic acid and a salt thereof, non-patent document 1 discloses a method in which aspartic acid is heat condensed at 200° C. for 2 to 3 hours to obtain a polysuccinimide and this is hydrolyzed to produce a polyaspartic acid with a molecular weight of 10000. Patent document 1 discloses a method in which aspartic acid is polymerized under nitrogen atmosphere at a temperature of 180° C. or more for 3 to 6 hours with stirring in a fluidized bed to obtain a polysuccinimide and this is hydrolyzed to produce a polyaspartic acid. Patent document 2 discloses a method in which aspartic acid is heated to 200 to 230° C. in a water-insoluble solvent to obtain a polysuccinimide and this is hydrolyzed by an alkaline aqueous solution to produce a polyaspartic acid salt. In the description of Example 1, a polyaspartic acid salt with a weight average molecular weight (Mw) of 24000 is obtained.

By each above-mentioned method, a polyaspartic acid and a salt thereof with an Mw of 10000 or more can relatively easily be produced. However, since there is a problem that the polysuccinimide is not melted but is consolidated, the process comes to be cumbersome such that a specific apparatus is used to crush and a high boiling point solvent is used to conduct suspension polymerization. Also, it is disadvantageous as an industrial process that aspartic acid which is a raw material is expensive.

On the other hand, there is a method in which maleamic acid or maleic anhydride and ammonia is used as a raw material to obtain a polysuccinimide and this is hydrolyzed to produce a polyaspartic acid. For example, patent document 3 discloses a method in which maleamic acid is heated to a temperature of 160 to 330° C. to obtain a polysuccinimide. Also, patent document 4 discloses a method in which maleic anhydride is reacted with an aqueous ammonia in water solvent and is then heated to a temperature of at least 170° C. to obtain a polysuccinimide and this is hydrolyzed by a base to produce a polyaspartic acid salt.

Each above-mentioned method is industrially an advantageous method because relatively inexpensive maleic anhydride and ammonia are used as a raw material. However, it involves a problem regarding consolidation of the polysuccinimide as in the case of polyaspartic acid raw material. In order to solve the problem, for example, the patent document 3 proposes (1) using a processing aid such as zeolite or silicate, (2) using a diluent such as tetrahydronaphthalene or a surfactant, and (3) using a solvent such as sulfolane or dimethylsulfoxide. However, in the methods (1) and (2), the process is cumbersome because the processing aid and the diluent must be removed. Also, in the method (3), the process is also cumbersome because the polysuccinimide must be isolated by a method such as reprecipitation. Furthermore, the Mw of the polyaspartic acid described in the Example is approximately 2000. Further, since the polymerization temperature high, it comes to be a problem that coloration of the polymer is large.

Also, in patent document 5, aspartic acid or product obtained from maleic anhydride and ammonia is heat polymerized in water solvent, and is hydrolyzed to produce a polyaspartic acid salt. However, since the polymerization temperature must be 150 to 300° C., it becomes a high pressure reaction and a reactor for high pressure reaction must be used. Further, as for the molecular weight of the polyaspartic acid obtained, it is described that Mw=500 to 10000 (preferably Mw=1000 to 5000), and it is difficult to obtain a polyaspartic acid with an Mw of more than 10000. Also, since the polymerization temperature high, it comes to be a problem that coloration of the polymer is large.

Also, patent document 6, patent document 7, and patent document 8 disclose a method in which maleamic acid or a product obtained from maleic anhydride and ammonia is polymerized in a continuous polymerization apparatus and the polysuccinimide obtained is hydrolyzed to produce a polyaspartic acid salt. However, in these methods, a specific polymerization apparatus is needed overcome difficulty of bulk polymerization. Also, as for the molecular weight of the polyaspartic acid and the salt thereof obtained, it is described that Mw=500 to 10000 (preferably Mw=1000 to 5000) due to the limitation of the retention time, and it is difficult to obtain a polyaspartic acid with an Mw of more than 10000.

On the other hand, patent document 9 discloses a method for producing a polyaspartic acid in which maleamic acid or a product obtained from maleic anhydride and ammonia is hydrogen transfer polymerized in a presence of a vinyl polymerization inhibitor and a basic catalyst. In the description of Example, it is described that maleamic acid is polymerized in a presence of hydroquinone in tetrahydrofuran solvent using sodium t-butoxide or sodium hydroxide as a catalyst to obtain a polyaspartic acid with Mw>20000. However, although there is no detailed description in the Example, since there is a description that water is generated as a by-product during the reaction, a polysuccinimide is produced also in this reaction and the must be cumbersome process is unavoidable such that it must be isolated by reprecipitation.

As is clear from the problem of each above-mentioned prior art, there hardly seems to be a satisfactory method in which a polyaspartic acid and a salt thereof are industrially easily produced from maleamic acid or a product obtained from maleic anhydride and ammonia that is inexpensive in the prior art.

PRIOR ART DOCUMENT

Patent Document

Patent document 1: U.S. Pat. No. 5,057,597
Patent document 2: JP 3384420 B
Patent document 3: JP 6-145350 A
Patent document 4: JP 3431154 B
Patent document 5: JP 3419067 B
Patent document 6: JP 3178955 B
Patent document 7: JP 3683064 B
Patent document 8: JP 3385587 B
Patent document 9: JP 2000-290368 A Non-Patent Document Non-patent document 1: J. Am. Chem. Soc., 80, 3361 (1958)

SUMMARY OF THE INVENTION

Problem to be Solved by the Invention

It is an object of the present invention to provide a method for industrially inexpensively and easily producing a polyaspartic acid salt from maleamic acid or a product obtained from maleic anhydride and ammonia Means of Solving the Problems The inventors found, as a result of their earnest research, that the use of a particular kind of monomer as at least one kind monomer selected from a product obtained from maleic anhydride and ammonia and, maleamic acid that are inexpensive provides an excellent advantageous effect, and they achieved the present invention.

That is, the present invention is a method for producing a polyaspartic acid precursor polymer by polymerization using at least one kind selected from a product obtained from maleic anhydride and ammonia and, maleamic acid as a monomer, wherein at least part of carboxyl groups in the monomers are a tertiary amine salt.

Also, the present invention is a method for producing a polyaspartic acid precursor polymer, wherein water or an aprotic polar solvent is added when the monomer is polymerized in the above-mentioned method.

Also, the present invention is a tertiary amine salt of maleamic acid that is a novel compound.

Further, the present invention is a polyaspartic acid precursor polymer obtained by the above-mentioned method.

Further, the present invention is a method for producing a polyaspartic acid salt by treating the polyaspartic acid precursor polymer obtained by the above-mentioned method with a basic aqueous solution.

Effect of the Invention

According to the present invention, when the polymerization using at least one kind selected from a product obtained from maleic anhydride and ammonia and, maleamic acid that are inexpensive as a monomer is carried out, a carboxyl group in the monomer is a tertiary amine salt, to enable a polymerization reaction under melting condition, which is conventionally difficult, and thereby a polyaspartic acid precursor polymer with a high molecular weight can be produced without using a specific apparatus. Further, water or an aprotic polar solvent is added when the monomer is polymerized, to reduce polymerization viscosity, and it becomes possible to use a broad general apparatus. Also, since the polymerization at a relatively low temperature can be carried out, a polyaspartic acid salt with an excellent color phase can easily be produced by treating the precursor polymer with a basic aqueous solution. Besides, since the tertiary amine used can easily be recovered by a usual method, it is a very effective production method from an industrial standpoint.

BRIEF DESCRIPTION OF DRAWINGS

FIG. 1 is an IR chart of Example 1.
FIG. 4 is an IR chart of Example 4.
FIG. 6 is an IR chart of Example 6.
FIG. 8 is an IR chart of Example 8.

MODE FOR CARRYING OUT THE INVENTION

Figure 2:
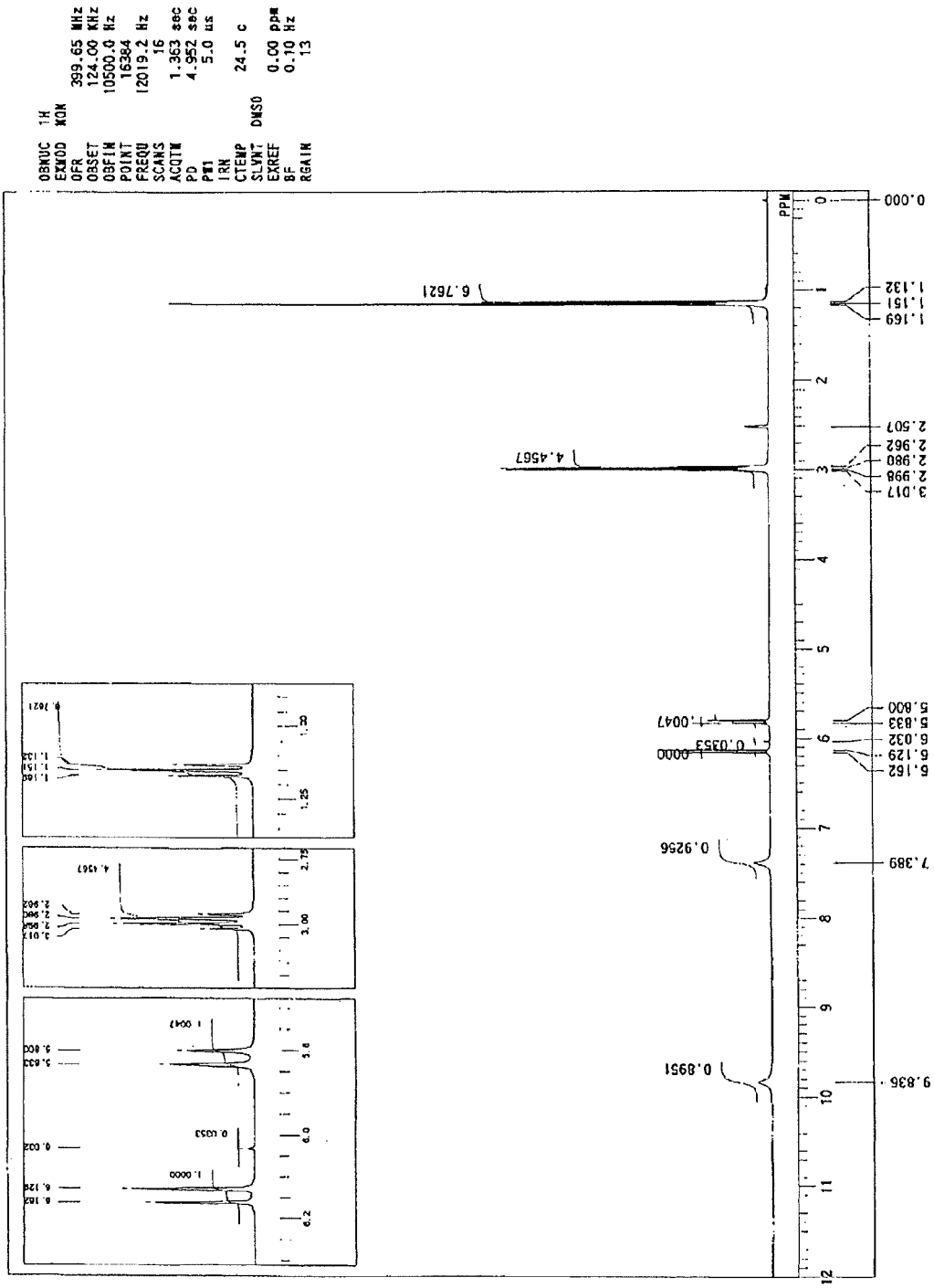
FIG. 2 is an NMR chart of Example 1.

In the method of the present invention, at least one kind selected from a product obtained from maleic anhydride and ammonia and, maleamic acid is used as a monomer. And, at least part of carboxyl groups in the monomers must constitute a tertiary amine salt.

A product obtained from maleic anhydride and ammonia and, maleamic acid can be easily synthesized by a well-known method. These may be used alone respectively or the mixture thereof may be used. Also, these may be used respectively after isolation or may be used respectively as a synthetic reaction composition without isolating operation. These monomers can be mixed and reacted respectively with a tertiary amine in a presence or absence of a solvent to change a carboxyl group in the monomer to a tertiary amine salt. The tertiary amine is not particularly limited as long as it can form a salt with a carboxyl group in the monomer. The tertiary amine constituting the tertiary amine salt is a compound represented by following general formula (1):

$$NR^1R^2R^3 \qquad (1)$$

wherein, in the formula, $R^1$, $R^2$, and $R^3$ are an alkyl group in which a part of hydrogen atoms may be substituted by a halogen atom, hydroxyl group, and/or an alkoxyl group with a carbon number of 1 to 3, or are an aryl group in which a part of hydrogen atoms may be substituted by an alkyl group with a carbon number of 1 to 4, an alkoxyl group with a carbon number of 1 to 3, and/or a halogen atom, and these may be identical to or different from one another; and wherein $R^1$ and $R^2$ and/or $R^2$ and $R^3$ may also be bonded to form a ring which has a tertiary nitrogen atom or a tertiary nitrogen atom and another heteroatom.

In the general formula (1), "an alkyl group in which a part of hydrogen atoms may be substituted by a halogen atom, hydroxyl group, and/or an alkoxyl group with a carbon number of 1 to 3" in the definition of $R^1$, $R^2$, and $R^3$ may be an alkyl group in any state of linear, branched or ring. As for this alkyl group, a part of hydrogen atoms (usually 1 to 3 hydrogen atoms) may be substituted by a halogen atom, hydroxyl group, and/or an alkoxyl group with a carbon number of 1 to 3. Examples of the halogen atom include fluorine atom, chlorine atom, bromine atom, and iodine atom. Examples of the alkoxyl group with a carbon number of 1 to 3 include methoxyl group, ethoxyl group, n-propoxyl group, and isopropoxyl group. Examples of the alkyl group include methyl group, ethyl group, n-propyl group, isopropyl group, n-butyl group, tert-butyl group, n-pentyl group, n-hexyl group, cyclohexyl group, octyl group, and decyl group. Among these, lower alkyl groups with a carbon number of 1 to 4 are preferable because the raw material is easily obtained. Also, examples of the alkyl group in which a part of hydrogen atoms are substituted include 2,2,2-trifluoroethyl group, 2-hydroxyethyl group, 2-methoxyethyl group, and 3-chloropropyl group.

In the general formula (1), "an aryl group in which a part of hydrogen atoms may be substituted by an alkyl group with a carbon number of 1 to 4, an alkoxyl group with a carbon number of 1 to 3, and/or a halogen atom" in the definition of $R^1$, $R^2$, and $R^3$ may be an aromatic hydrocarbon-type aryl group or a heteroaromatic-type aryl group. As for this aryl group, a part of hydrogen atoms (usually 1 to 3 hydrogen atoms) may be substituted by an alkyl group with a carbon number of 1 to 4, an alkoxyl group with a carbon number of 1 to 3, and/or a halogen atom. Examples of the alkyl group with a carbon number of 1 to 4 include methyl group, ethyl group, n-propyl group, isopropyl group, n-butyl group, sec-butyl group, tert-butyl group, and isobutyl group. Examples of the alkoxyl group with a carbon number of 1 to 3 include methoxyl group, ethoxyl group, n-propoxyl group, and iso-propoxyl group. Examples of the halogen atom include fluorine atom, chlorine atom, bromine atom, and iodine atom. Examples of the aryl group include phenyl group, naphthyl group, anthracenyl group, pyridyl group, quinolyl group, furyl group, and thienyl group. Also, examples of the aryl group in which a part of hydrogen atoms are substituted include 4-methyl phenyl group, 4-methoxyl phenyl group, 3-fluorophenyl group, and 2,4-dichloro phenyl group.

In the general formula (1), "$R^1$ and $R^2$ and/or $R^2$ and $R^3$ may also be bonded to form a ring which has a tertiary nitrogen atom or a tertiary nitrogen atom and another heteroatom" means a formation of a ring containing one or more tertiary nitrogen atoms or a formation of a ring containing a tertiary nitrogen atom and another heteroatom, by bonding $R^1$ and $R^2$ and/or $R^2$ and $R^3$. Examples of the ring containing one or more tertiary nitrogen atoms include N-methylpyrrolidine, N-methylpiperidine, quinuclidine, 1,4-diazabicyclo[2.2.2]octane (hereinafter abbreviated to "DABCO"), 1,8-diazabicyclo[5.4.0]-7-undecene (hereinafter abbreviated to "DBU"), and N-methylindole. Examples of the ring containing a tertiary nitrogen atom and another heteroatom include N-methylmorpholine, and N-methylthiomorpholine.

A tertiary amine constituting a tertiary amine salt preferably has high basicity because it easily form a salt with a carboxyl group in the monomer. Specifically, for example, a compound in which a conjugated acid of a protonated tertiary amine indicates a pKa of 8.0 or more in water or in dimethylsulfoxide is preferable. Examples of such a tertiary amine include trimethylamine, triethylamine, tripropylamine, di(isopropyl)ethylamine, quinuclidine, N-methylpyrrolidine, N-methylpiperazine, DABCO, DBU, and 4-(N,N-dimethylamino)pyridine. Among them, trialkyl amines such as trimethylamine and triethylamine are preferable because these are easily industrially obtained and are easily recovered. In particular, triethylamine is more preferable.

When a monomer is mixed and reacted with a tertiary amine in a presence of a solvent, the solvent is not particularly limited. Examples of the solvent include hydrocarbon solvents such as n-pentane, n-hexane, cyclohexane, and n-heptane; aromatic solvents such as toluene, xylene, cumene, mesitylene, chlorobenzene, and ortho-dichlorobenzene; ether solvents such as diethyl ether, tetrahydrofuran, cyclopentyl methyl ether, anisole, diphenyl ether, and ethyleneglycol dimethyl ether; alcohol solvents such as methanol, ethanol, n-propanol, isopropanol, n-butanol, t-butanol, n-pentanol, n-octanol, ethyleneglycol, and polyethylene glycols; and aprotic polar solvents such as dimethylformamide, dimethylacetamide, N-methylpyrrolidone, 1,3-dimethyl-2-imidazolidinone, dimethylsulfoxide, and sulfolane. The solvent as used herein includes a liquid medium which does not dissolve a monomer and/or a tertiary amine salt of a monomer. The reaction temperature is not particularly limited, but is preferably equal to or lower than the boiling point of the tertiary amine used. When a solvent is used, it is preferably equal to or lower than the boiling point of the solvent.

When a monomer and a tertiary amine are mixed, the molar ratio of a carboxyl group in the monomer and the tertiary amine is not particularly limited. However, at least part of the carboxyl groups must become the tertiary amine salt. The molar ratio of the carboxyl group in the monomer: the tertiary amine is usually 1:0.05 to 1.5, preferably 1:0.15 to 1.2, and more preferably 1:0.3 to 1. A method for mixing the monomer and the tertiary amine is not particularly limited. It is more preferable that the monomer and the tertiary amine can uniformly be contacted by stirring or the like. By such a method, a particular monomer in which at least part of the carboxyl groups are the tertiary amine salt can be obtained. Hereinafter, this is referred to as "tertiary amine salt of monomer"

The obtained tertiary amine salt of the monomer can be used for a polymerization reaction without isolation. Also, it can be isolated by a usual operation such as filtration or desolvation if necessary.

The present invention is characterized in that the above-described tertiary amine salt of the monomer is polymerized. The polymer is not a polysuccinimide but a novel polyaspartic acid precursor polymer which partially has a tertiary amine salt structure of a polyaspartic acid. And, since this polyaspartic acid precursor polymer has a clear melting point unlike a polysuccinimide, when the polymerization temperature is set to be higher than the melting point, the polymerization proceeds in a flowable and melting state. Further, since this polyaspartic acid precursor polymer has an ion pair structure by a tertiary amine salt, it has water-solubility and water or an aprotic polar solvent can be added to reduce the polymerization viscosity. On the other hand, in the prior art, a general monomer is polymerized to produce a polysuccinimide. Since the polysuccinimide does not have a clear melting point, is kept solid until thermal decomposition, and does not have water-solubility, there arises a problem such as consolidation during the polymerization.

As for the tertiary amine salt of the monomer, a part of carboxyl groups in the monomers should be a tertiary amine salt. However, the ratio of the tertiary amine salt is preferably higher because the melting viscosity comes to be lower during the polymerization. 5% or more of the total molar number of the carboxyl group in the monomer is usually the tertiary amine salt, 15% or more is preferably the tertiary amine salt, and 30% or more is more preferably the tertiary amine salt.

The polymerization reaction can be carried out in a presence or absence of a solvent. In the method of the present invention, the solvent is not particularly required, but there is no problem in that a solvent is used for uniform heat transfer and for improvement of heat dissipation. The solvent as used herein include a liquid medium in which a raw material and/or a polymer is not dissolved. Examples of the polymerization type using a solvent include solution polymerization, suspension polymerization, and two phase polymerization. The solvent is not limited as long as it should not adversely affect the reaction. Examples of the solvent include hydrocarbon solvents such as toluene, xylene, cumene, and hexane; halogen solvents such as dichloromethane and chloroform; ether solvents such as diethyl ether, tetrahydrofuran, and 1,4-dioxane; ester solvents such as ethyl acetate and butyl acetate; and aprotic polar solvents such as acetonitrile, N,N-dimethylformamide, dimethylsulfoxide, N-methylpyrrolidinone, and 1,3-dimethyl-2-imidazolidinone. In particular, poorly water-soluble solvents such as hydrocarbon solvents and halogen solvents are preferable because they can easily be separated by liquid separation when a polyaspartic acid salt is obtained by the treatment with a basic aqueous solution. Also, each solvent can be used as a mixed solvent in an arbitrary ratio.

For the polymerization reaction, a catalyst can also be used if necessary. However, an acid catalyst is not preferable because the tertiary amine salt may be released.

Also, during the polymerization reaction, water or an aprotic polar solvent can be added if necessary. Since the polyaspartic acid precursor polymer obtained by the method of the present invention has not only meltability but also water-solubility, water or an aprotic polar solvent can be added to further reduce the polymerization viscosity. In particular, the embodiment of water addition is most preferable because it has high effect to reduce the polymerization viscosity and it need not be separated in the subsequent process. Water or an aprotic polar solvent can be added before the polymerization reaction and/or during the polymerization reaction. The amount of the water or the aprotic polar solvent added is not limited, but usually, it is preferably 10 to 300 mol % with respect to the total molar number (100 mol %) of the monomer to be polymerized. The lower limit of this range is significant from the point of the reduction effect of polymerization viscosity. Also, the upper limit is significant from the point of the limitation of the reduction effect and from the point of preventing decreasing the polymerization rate. In particular, when water is added before the polymerization, 10 to 100 mol % is preferable from the point of preventing decreasing the polymerization rate. The total amount of water or an aprotic polar solvent may be added in a lump, or may be divided and added. For example, it is a preferable embodiment that water or an aprotic polar solvent was divided and added as needed when the polymerization viscosity is raised, because the polymerization viscosity constantly maintains lower.

The polymerization temperature is not particularly limited as long as the reaction proceeds at the temperature and it is higher than the melting point of the polyaspartic acid precursor polymer obtained. Specifically, the polymerization temperature may appropriately be set, depending on the kind of the tertiary amine and the content of the tertiary amine salt. The polymerization temperature is usually 0° C. to 350° C., preferably 50° C. to 200° C., and more preferably 80° C. to 140° C. By setting the polymerization temperature in the appropriate range, polymer coloration can be prevented and the polymer is melted at a practical polymerization rate to solve a problem of consolidation of the polymer.

The polymerization time may appropriately be set, depending on the condition such as the optimum molecular weight of the polyaspartic acid precursor polymer desired, the kind of the tertiary amine and the content of the tertiary amine salt, and the polymerization temperature. It is usually 1 minute to 100 hours, preferably 5 minutes to 30 hours, and particularly preferably 15 minutes to 15 hours. By setting the polymerization time in the appropriate range, the optimum molecular weight of the polyaspartic acid precursor polymer desired can be realized and there is a small amount of the remaining raw material, and the production efficiency is also improved.

The polymerization method may be any one of a batch type or a continuous one. The apparatus for the polymerization is not particularly limited and a well-known apparatus can be used.

The polyaspartic acid precursor polymer obtained by the present invention is not a polysuccinimide but a novel polyaspartic acid precursor polymer which partially has a tertiary amine salt structure of a polyaspartic acid. That is, it is a polyaspartic acid precursor polymer characterized in that it has both partial structures represented by following general formulae (2) and (3):

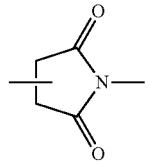
(2)

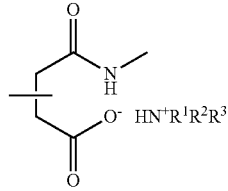
(3)

wherein, in the formula, $R^1$, $R^2$, and $R^3$ have the same meaning as the general formula (1).

These partial structures can be identified from the absorption of imide (around 1700 cm$^{-1}$) and the absorption of amide (around 1580 cm$^{-1}$) as well as by the absorption of tertiary amine salt of carboxyl group (wide absorption at around 2700 to 2250 cm$^{-1}$), by IR.

The ratio of the partial structures of the general formula (2) and the general formula (3) is not particularly limited. However, the amount of the partial structure of the general formula (3) is preferably larger because the melting point of the polymer becomes lower and the flow starting temperature becomes lower. The content of the partial structure of the general formula (3) is usually 5% or more with respect to the total partial structure, preferably 15% or more, and more preferably 30% or more. The content of the partial structure represented by the general formula (3) can be evaluated by calculating the amount of the tertiary amine in the polyaspartic acid precursor polymer obtained from the integral ratio of $^1$H-NMR.

The molecular weight of the polyaspartic acid precursor polymer can usually be evaluated by GPC analysis in which the molecular weight is calibrated by a molecular weight standardized material. Also, in this case, it can be evaluated as the polyaspartic acid precursor polymer per se or as the polyaspartic acid salt by the treatment with a basic aqueous solution.

The molecular weight of the polyaspartic acid precursor polymer is not particularly limited. The weight average molecular weight (Mw) thereof is usually 2000 to 100000, preferably 5000 to 30000, and more preferably 7000 to 20000. The melting point of the polyaspartic acid precursor polymer depends on the molecular weight of the polymer, the kind of the tertiary amine, the content of the tertiary amine salt, and the like, but it is usually 0 to 200° C., and preferably 30 to 120° C.

A polyaspartic acid precursor polymer in a glassy solid is obtained by cooling after the polymerization. When a solvent is used during the polymerization, the solvent can be removed by a usual method such as decant separation or solvent removal to isolate the polymer. Also, it is not isolated but is changed to a polyaspartic acid salt by the treatment with a basic aqueous solution.

After having polymerized until the polymer becomes the desired molecular weight, the polyaspartic acid precursor polymer obtained is treated with a basic aqueous solution to obtain a polyaspartic acid salt. As the basic aqueous solution, a base which is stronger basic than the tertiary amine is used. Examples of the basic aqueous solution include aqueous solutions of hydroxide or carbonate of an alkali metals or an alkaline earth metal. In particular, an aqueous solution of NaOH, KOH, or LiOH is preferable, and an aqueous solution of NaOH is more preferable. The density of the base is not particularly limited, but a 0.5 to 50 mass % solution is usually preferable. In some cases, water is previously added and a base or a basic aqueous solution is then added for the treatment.

The amount of the basic aqueous solution used should be an amount which is sufficient to change the polyaspartic acid precursor polymer to a polyaspartic acid salt. Usually, there is no problem as long as the molar number of the base used is in the range of 90 to 120% to the total molar number of carboxyl group and imide group in the polyaspartic acid precursor polymer. The temperature for the basic aqueous solution should be a temperature at which the polymer main chain is not hydrolyzed, but it is usually preferably 10° C. to 120° C.

By the treatment with this basic aqueous solution, the tertiary amine is released from the polyaspartic acid precursor polymer. This tertiary amine released can be easily separated and recovered by a usual process such as liquid separation, extraction, distillation, and filtration, and can be reused.

The aqueous solution of the polyaspartic acid salt obtained as described above can be used without isolation, but it can be isolated as a powder by a method such as freezing dry. Also, it can be isolated as a polyaspartic acid by appropriate neutralization with an acid. The polyaspartic acid salt obtained by the method of the present invention has an excellent color phase as compared to a polyaspartic acid salt obtained by a usual method.

Note that, the tertiary amine salt of maleamic acid used in the present invention is per se a novel compound. Examples of the tertiary amine salt of maleamic acid which can particularly preferably be used in the present invention include a tertiary amine salt of maleamic acid in which a tertiary amine thereof is represented by following general formula (4):

$$NR^4R^5R^6 \qquad (4)$$

wherein, in the formula, $R^4$, $R^5$ and $R^6$ are a linear or branched alkyl group with a carbon number of 1 to 4, and these may be identical to or different from one another. In particular, a triethylamine salt of maleamic acid is most preferable.

EXAMPLE

The Examples of the present invention is described below. However, the present invention is not limited to these. The measuring method of each physical property is as follows.
(1) IR Measurement:
The measurement was carried out by a reflection method using Spectrum One (trade name) made by PERKIN-ELMER under the following conditions:
 range of wavelength: 4000 to 400 cm$^{-1}$,
 cumulated number: 16 times, and
 resolution: 4 cm$^{-1}$.
(2) GPC Analysis:
The measurement was carried out under the following conditions:
 column used: shodex Ashahipak GF-7M HQ (trade name),
 eluent: 0.1M NaCl aqueous solution,
 column temperature: 40° C.,
 flow rate: 1 ml/min,
 detector: RI, and
 preparation of molecular weight calibration curve:
The molecular weight calibration curve was prepared using Shodex STANDARD (trade name) P-5 (Mp=5900), P-10 (Mp=9600), P-20 (Mp=21100), and P-50 (Mp=47100) as a molecular weight standardized pullulan.
(3) Measurement of Melting Point:
The measurement was carried out by visual inspection using a melting point measuring apparatus B-545 type made by BUCHI.
(4) Measurement of Flow Starting Temperature:
Using a capillary rheometer CFT-500D (trade name) made by Shimadzu Corporation, 0.8 g of a sample polymer was preheated at 40° C. with a heater for 5 minutes, and after that the weight of 100 Kgf was loaded to the piston with elevating the temperature at 3° C./minute. The flow starting temperature assumed a temperature at which the melting polymer begun to flow out. However, the upper limit thereof was 200° C.
(5) Measurement of YI Value:
The YI value was measured using a spectrum colorimeter SE-2000 made by Nippon Denshoku Industry Co., Ltd. by providing 5% aqueous solution of a polyaspartic acid salt was provided in a cell for transmission measurement and by averaging the measurement values of 3 times.
(6) Measurement of Polymerization Viscosity (Measurement of Stirring Torque Value):
The viscosity change during the polymerization was represented by a stirring torque value using a stirring motor EYELA MAZELA Z (trade name) made by Tokyo Rikakikai Co., LTD.

Example 1

The Production of a Triethylamine Salt of Maleamic Acid

Using a four-necked flask of 500 ml which is equipped with a thermometer, a reflux condenser tube, a mechanical stirrer, and a dripping funnel, 115 g of maleamic acid was suspended in 200 g of toluene under nitrogen atmosphere and 102 g of triethylamine was added at room temperature with stirring this suspension. Then, it was heated to 60° C. and the temperature was maintained for 2 hours, and after that it was cooled. Toluene was removed from the cooled reaction mass using a rotary evaporator to obtain 188 g of smooth white powder.

An IR measurement was carried out to this white powder and it was confirmed that a triethylamine salt of maleamic acid was produced. The IR chart is shown in FIG. 1. Also, an NMR measurement was carried out and it was confirmed from the integral ratio of 1H-NMR that the triethylamine salt ratio was 75%. The data is shown below and the NMR chart is shown in FIG. 2.

$^1$H-NMR (DMSO-d$_6$, 400 MHz) δ 1.51 (t, 6.76H, J=7.2 Hz), 2.99 (q, 4.46H, J=7.2 Hz), 5.82 (d, 1H, J=13.2 Hz), 6.15 (d, 1H, J=13.2 Hz), 7.39 (bs, 1H), 9.84 (bs, 1H)

Example 2

The Production of a Sodium Polyaspartate by Polymerization of a Triethylamine Salt of Maleamic Acid (an Example Using a Solvent)

Using a four-necked flask of 500 ml which is equipped with a thermometer, a reflux condenser tube, a mechanical stirrer, and a dripping funnel, 80 g of the triethylamine salt of maleamic acid obtained in Example 1 and 53 g of xylene were provided under nitrogen atmosphere, and it was heated to 120° C. with stirring and the polymerization was carried out at the temperature for 8.5 hours. It was a white slurry state before the polymerization, but when the polymerization reaction proceeded, a red-brown melting polymer was generated via a melting salt. During this polymerization reaction, the polymer was stirred by the stirrer without consolidation. Then, 30 g of water was added and the temperature was decreased to 60° C., and 41 g of 50% aqueous NaOH was further added and it was treated at 60 to 80° C. After having confirmed that the polymer was completely dissolved in water, the stirring was stopped and it was left to stand for two phase separation.

The xylene phase containing triethylamine was removed from two phase separation liquid to obtain a 55 mass % aqueous solution of a sodium polyaspartate. The weight average molecular weight (Mw) of this sodium polyaspartate was 12000.

Example 3

The Production of a Polyaspartic Acid Precursor Polymer by Polymerization of a Triethylamine Salt of Maleamic Acid To a test tube of 100 ml having a magnetic stirrer, 3 g of maleamic acid, 3 g of xylene and 2.68 g of triethylamine (100 mol %/maleamic acid) were provided and it was heated under nitrogen atmosphere with stirring. After having confirmed that maleamic acid was changed to a triethylamine salt and was melted in the process of heating, the polymerization was carried out at 100° C. for 12 hours. During the polymerization, the polymer was in a melting state. Xylene was decanted and separated from this polymer melting liquid and it was cooled to room temperature to obtain a red-orange glassy polymer.

Figure 3:
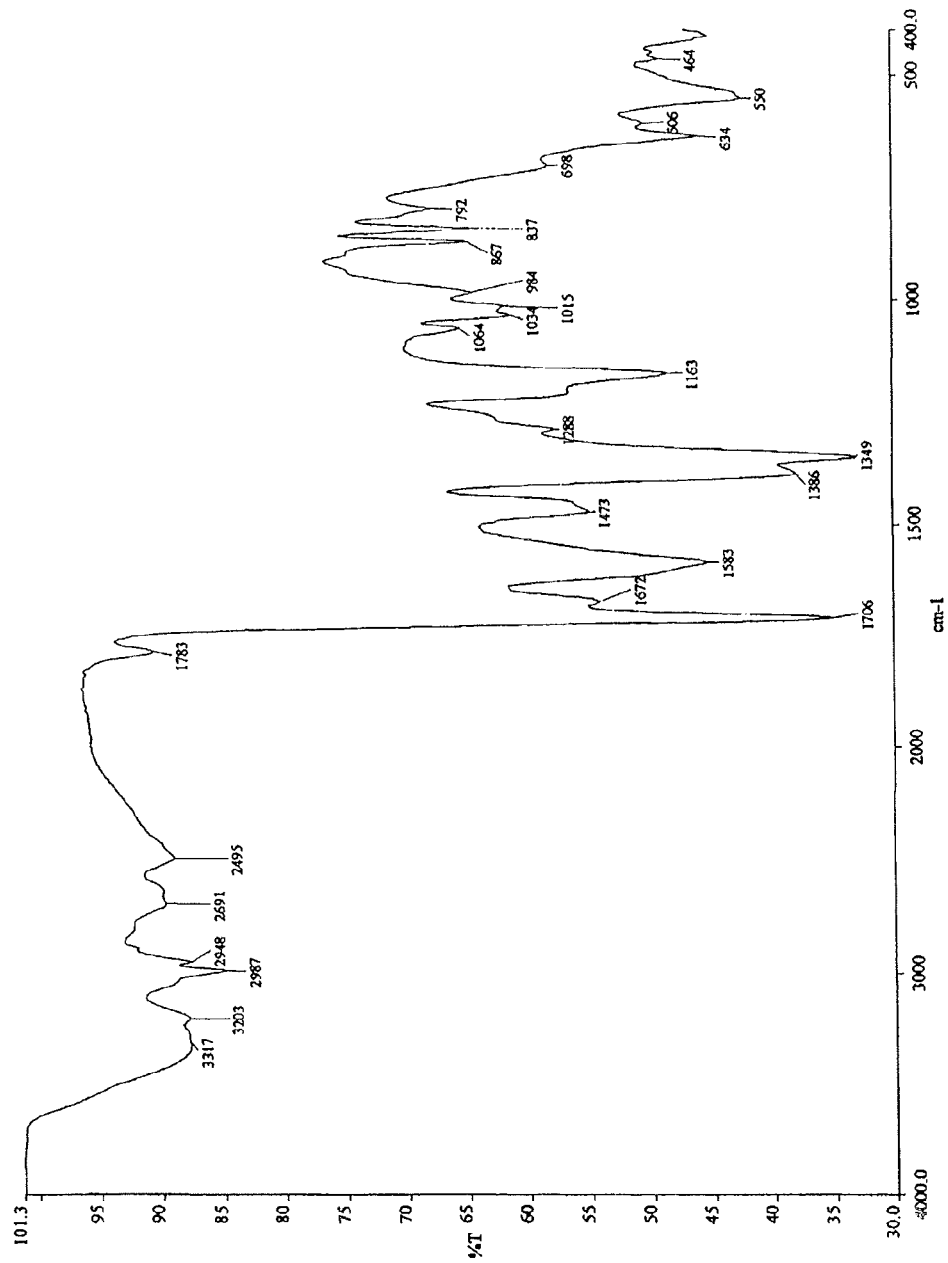
FIG. 3 is an IR chart of Example 3.
Figure 5:
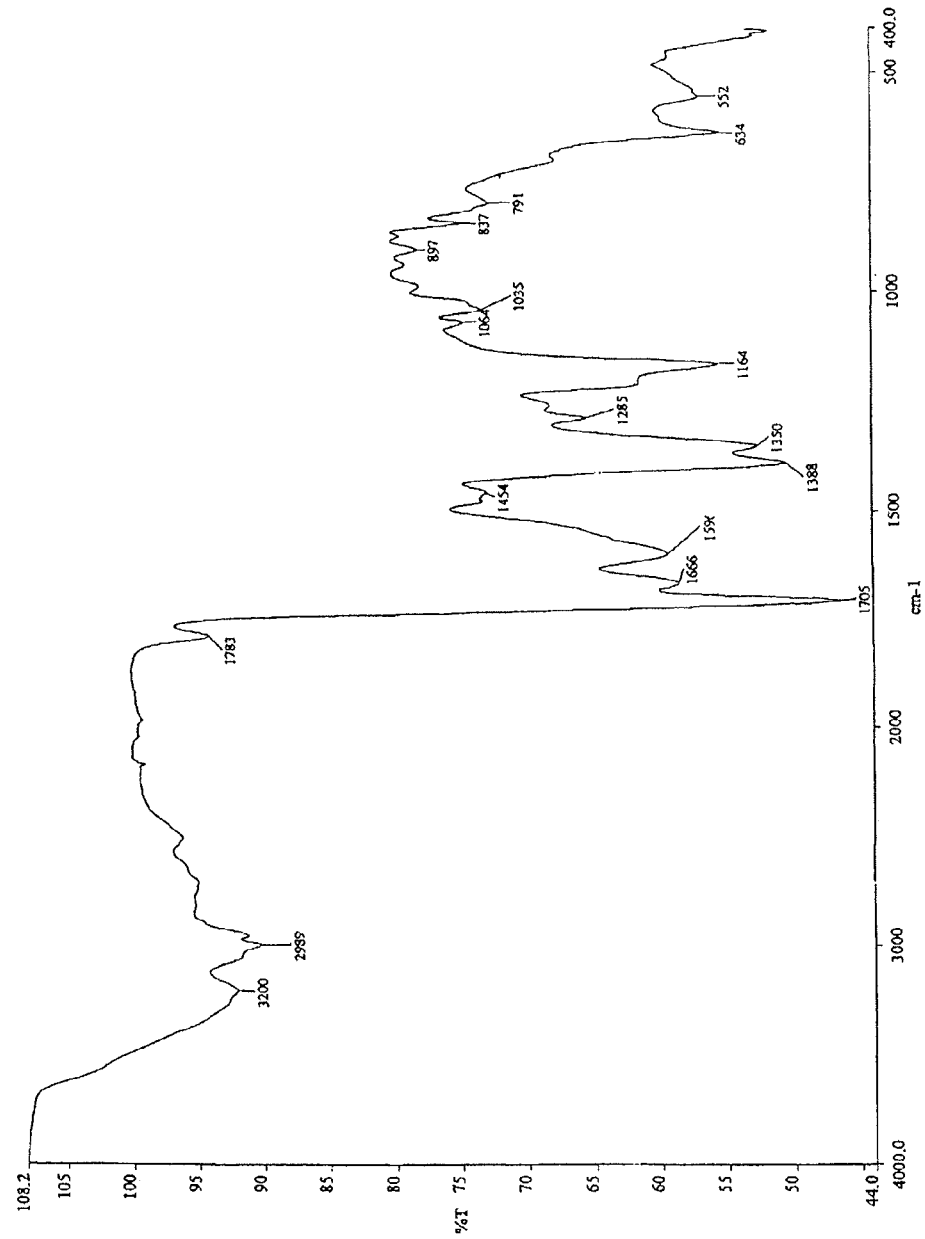
FIG. 5 is an IR chart of Example 5.
Figure 7:
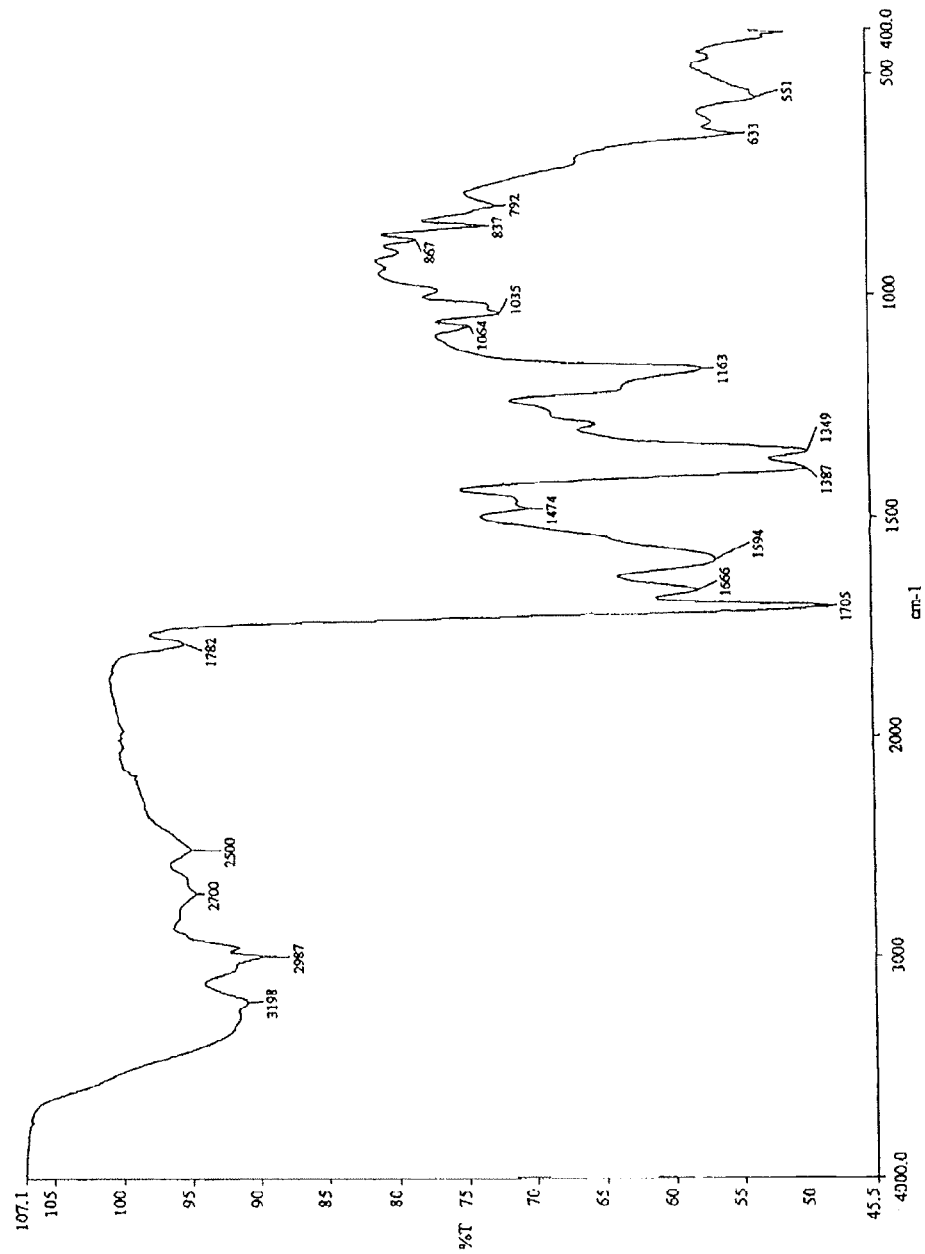
FIG. 7 is an IR chart of Example 7.

An IR measurement was carried out to this red-orange glassy polymer and it was confirmed that a polyaspartic acid precursor polymer, which has a polysuccinimide structure and a tertiary amine salt structure of a polyaspartic acid, was produced. The IR chart is shown in FIG. 3. Also, the Mw of this polymer after the treatment with an NaOH aqueous solution was 10895.

Examples 4 to 8

The Productions of a Polyaspartic Acid Precursor Polymer by Polymerization of a Triethylamine Salt of Maleamic Acid (Influence by the Amount of Triethylamine To each test tube of 100 ml having a magnetic stirrer, 10 g of maleamic acid was provided and triethylamine were respectively added in a different amount of 15, 30, 50, 75, and 100 mol %/maleamic acid, and it was heated under nitrogen atmosphere with stirring. Each polymerization was carried out at 120° C. for 6 hours to obtain a polyaspartic acid precursor polymer. Each polymerization condition, state during the polymerization, and various physical property values are shown in Table 1 together. Also, The IR charts of the polymers obtained in Examples 4 to 8 are respectively shown in FIGS. 4 to 8.

Comparative Example 1

The Production of a Polysuccinimide by Polymerization of Maleamic Acid

Figure 9:
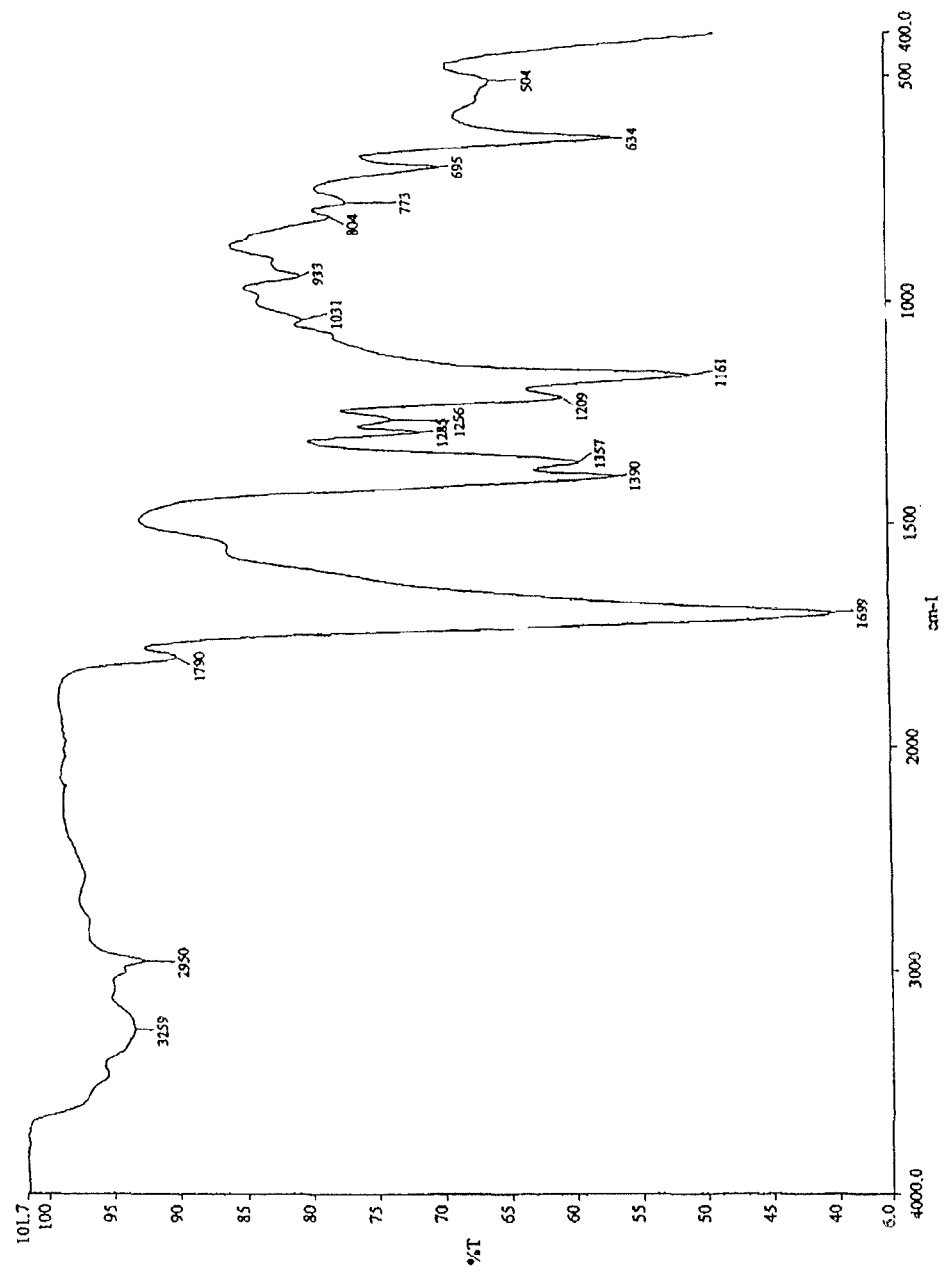
FIG. 9 is an IR chart of Comparative Example 1.

This Comparative Example was carried out under the same condition as Example 4 except that triethylamine was not added and also the polymerization temperature was 130° C., and a polysuccinimide was obtained. The polymerization condition, state during the polymerization, and various physical property values of the polysuccinimide obtained are shown in Table 1 together. Also, The IR chart of the polysuccinimide is shown in FIG. 9.

Example 9

The Production of a Sodium Polyaspartate by Polymerization of a Triethylamine Salt of Maleamic Acid (an Example of Solvent-Free Method)

Using a capillary rheometer CFT-500D (trade name) made by Shimadzu Corporation, a 0.82 g of the triethylamine salt powder of maleamic acid obtained in Example 1 was provided in the cylinder, and it was heated to 130° C. for 2 hours and was extruded by the piston to obtain a melting red-orange polymer. This was treated with 10% aqueous NaOH to obtain a 5 mass % aqueous solution of a sodium polyaspartate. The Mw of the sodium polyaspartate was 9000.

Comparative Example 2

The Production of a Sodium Polyaspartate by Polymerization of Maleamic Acid (Solvent-Free Method)

This Comparative Example was carried out in the same manner as Example 9 except that the raw material was changed to maleamic acid. After the polymerization, a strand polymer was obtained. Also, the Mw of the sodium polyaspartate after the treatment with an NaOH aqueous solution was 4800.

Example 10

The Production of a Sodium Polyaspartate by Polymerization of a Triethylamine Salt of Maleamic Acid Using a four-necked flask of 500 ml which is equipped with a thermometer, a reflux condenser tube, a mechanical stirrer, and a dripping funnel, 60 g of maleamic acid and 53 g of xylene were provided under nitrogen atmosphere, and it was heated with stirring, and 15.9 g (30 mol %/maleamic acid) of triethylamine was added at 50° C. for salification. Further, the temperature was raised to 120° C. and the polymerization was carried out at the temperature for 7 hours to produce a red-brown melting polymer from a white slurry via a melting salt. During the polymerization, the polymer was stirred by the stirrer without consolidation. Then, 29 g of water was added and the temperature was decreased to 60° C., and 41 g of 50% aqueous NaOH was then added and it was treated at 60 to 80° C. After having confirmed that the polymer was completely dissolved in water, the stirring was stopped and it was left to stand for two phase separation. The xylene phase containing triethylamine was removed by liquid separation to obtain a 55 mass % aqueous solution of a sodium polyaspartate. The Mw of this sodium polyaspartate was 11700.

Comparative Example 3

The Production of a Sodium Polyaspartate by Polymerization of Maleamic Acid (an Example Using a Solvent)

Using a four-necked flask of 300 ml which is equipped with a thermometer, a reflux condenser tube, a mechanical stirrer, and a dripping funnel, 40 g of maleamic acid and 40 g of xylene were provided under nitrogen atmosphere, and it was heated to 130° C. with stirring. The polymerization was carried out at the temperature for 4.5 hours, but a red-orange foam polymer began to be produced from a white slurry and the stirring was stopped by consolidation after the polymerization for 1.5 hour. The polymerization was continued for 3 hours, but the consolidation state was not eliminated. After cooling, the form solid obtained was crushed and it was treated with an NaOH aqueous solution, and xylene was removed by liquid separation to obtain a 55 mass % aqueous solution of a sodium polyaspartate. The Mw of this sodium polyaspartate was 9500.

Examples 11 and 12

The Productions of a Sodium Polyaspartate by Polymerization of a Triethylamine Salt of Maleamic Acid (Content of a Tertiary Amine Salt)

Aqueous solutions of a sodium polyaspartate were obtained in the same manner as Example 10 except that the amount of triethylamine was changed to 26 g (50 mol %/maleamic acid) and 40 g (75 mol %/maleamic acid), respectively. Polymer states during the polymerization, stirrer states, and molecular weight are shown in Table 2 together with Example 10 and Comparative Example 3

Example 13

The Production of a Sodium Polyaspartate by Polymerization of a Triethylamine Salt of Maleamic Acid (an Example of High Molecular Weight)

To a test tube of 100 ml having a magnetic stirrer, 2 g of maleamic acid and 0.88 g of triethylamine (50 mol %/maleamic acid) were provided and it was heated under nitrogen atmosphere with stirring. After having confirmed that maleamic acid was changed to a triethylamine salt and was melted in the process of heating, the polymerization was carried out at 140° C. for 4 hours. During the polymerization, the polymer was in a melting state. This was treated with an NaOH aqueous solution and triethylamine was removed by xylene extraction to obtain a 5 mass % aqueous solution of a sodium polyaspartate. The Mw of this sodium polyaspartate was 14600.

Examples 14 to 18

The Productions of a Sodium Polyaspartate by Polymerization of Various Tertiary Salts of Maleamic Acid To a test tube of 100 ml having a magnetic stirrer, 3 g of xylene, 3 g of maleamic acid, and 15 mol % of various tertiary amines were provided and the polymerizations were carried out at 100° C. for 6 hours under nitrogen atmosphere with stirring. These were treated with an aqueous solution of NaOH to obtain aqueous solutions of a sodium polyaspartate. The kinds of a tertiary amine salt used, pK values, and molecular weights of the polymer are shown in Table 3.

Comparative Example 4

The Production of a Sodium Polyaspartate by Polymerization Of Maleamic Acid

This Comparative Example was carried out in the same manner as Example 14 except that a tertiary amine was not used. Maleamic acid was not polymerized and the raw material was recovered. The result is shown in Table 3.

Examples 19 and 20

The Productions of a Sodium Polyaspartate by Polymerization of a Triethylamine Salt of Maleamic Acid (Comparison of Color Phase)>

To a test tube of 100 ml having a magnetic stirrer, 3 g of xylene, 3 g of maleamic acid, and 15 mol % of triethylamine were provided and the polymerization was carried out at 90° C. for 15 hours or at 100° C. for 12 hours under nitrogen atmosphere with stirring. These were treated with an aqueous solution of NaOH to obtain aqueous solutions of a sodium polyaspartate. The Mw of the sodium polyaspartate and YI value of the 5% aqueous solution are shown in Table 4.

Comparative Example 5

The Production of a Sodium Polyaspartate by Polymerization of Maleamic Acid (Comparison of Color Phase)

An aqueous solution of sodium polyaspartate was obtained in the same manner as Example 19 except that triethylamine was not used and the polymerization was carried out at 130° C. for 12 hours. The Mw of this sodium polyaspartate and YI value of the 5% aqueous solution are shown in Table 4.

Example 21

The Production of a Sodium Polyaspartate by Polymerization of a Triethylamine Salt of Maleamic Acid (Addition of Water During the Polymerization)

Using a four-necked flask of 500 ml which is equipped with a thermometer, a reflux condenser tube, a mechanical stirrer, and a dripping funnel, 60 g of maleamic acid and 53 g of xylene were provided under nitrogen atmosphere, and it was heated with stirring, and 26 g (50 mol %/maleamic acid) of triethylamine was added at 80° C. for salification. Further, the temperature was raised to 120° C. to start the polymerization reaction. At this time, it changed from a white slurry to a melting salt state and the stirring torque value of the mechanical stirrer was 0.05 N·m. Further, with the procedure of the polymerization, a red-orange melting polymer was produced and the viscosity was raised. At the time of 2 hours from the polymerization starting, the stirring torque value was raised to 0.15 N·m. Thus, 6.6 g of water (70 mol % with respect to maleamic acid) was added. The viscosity was reduced and the torque value was decreased to 0.05 N·m. Then, the polymerization was carried out for 6 hours, but the torque value did not become more than 0.1 N·m. Then, 29 g of water was added and the temperature was decreased to 60° C., and 41 g of 50% aqueous NaOH was then added and it was treated at 60 to 80° C. After having confirmed that the polymer was completely dissolved in water, the stirring was stopped and it was left to stand for two phase separation. The xylene phase containing triethylamine was removed by liquid separation to obtain a 55 mass % aqueous solution of a sodium polyaspartate. The Mw of this sodium polyaspartate was 9342.

Example 22

The Production of a Sodium Polyaspartate by Polymerization of a Triethylamine Salt of Maleamic Acid (Addition of Water Before the Polymerization)

This Example was carried out in the same manner as Example 21 except that water was added at the time of salifying maleamic acid before the polymerization with triethylamine. The stirring torque value did not become more than 0.1 N·m during the polymerization. The Mw of the sodium polyaspartate obtained was 8875.

Example 23

The Production of a Sodium Polyaspartate by Polymerization of a Triethylamine Salt of Maleamic Acid (Split Addition of Water)

This Example was carried out in the same manner as Example 21 except that 10 mol % of water with respect to maleamic acid was added at each time when the stirring torque became 0.1 N·m. Water was added 5 times in 8 hours from the starting of the polymerization and the stirring torque value did not become more than 0.1 N·m during the polymerization. The Mw of the sodium polyaspartate obtained was 10839.

Example 24

The Production of a Sodium Polyaspartate by Polymerization of a Triethylamine Salt of Maleamic Acid (Addition of Dimethylformamide During the Polymerization)

In Example 21, 6.6 g (18 mol % with respect to maleamic acid) of dimethylformamide instead of water was added at the time when the stirring torque value became 0.15 N·m. The torque value was slightly decreased to 0.14. Further, 19.1 g of dimethylformamide (52 mol % with respect to maleamic acid) was additionally added. The viscosity was reduced and the torque value was decreased to 0.05 N·m. Then, the polymerization was carried out for 6 hours, but the torque value did not become more than 0.1 N·m. The Mw of the sodium polyaspartate obtained was 9454.

TABLE 1

| | Triethylamine Salt Content in Monomer (mol %/ carboxyl group) | Polymerization Temperature | Polymerization Time | Polymer State during Polymerization | Polymer Appearance | Content of Triethylamine Salt Partial Structure of Polyaspartic Acid in Polymer (calculated by 1H-NMR) | Melting Point of Polymer | Flow Starting Temperature of polymer | Molecular Weight (Mw) of Sodium Polyaspartate Treated with NaOH Aqueous Solution |
|---|---|---|---|---|---|---|---|---|---|
| Ex. 4 | 15 | 120° C. | 6 h | consolidated foam state and partially melting state | red-brown solid | 0.12 | 187-198° C. | 105° C. | 10150 |
| Ex. 5 | 30 | 120° C. | 6 h | melting state | red brown solid | 0.23 | 87-94° C. | 80° C. | 10920 |
| Ex. 6 | 50 | 120° C. | 6 h | melting state | red-brown solid | 0.34 | 65-69° C. | 64° C. | 10334 |
| Ex. 7 | 75 | 120° C. | 6 h | melting state | red brown solid | 0.33 | 61-63° C. | 59° C. | 9920 |
| Ex. 8 | 100 | 120° C. | 6 h | melting state | red-brown solid | 0.4 | 61-63° C. | 63° C. | 10079 |
| Comp. Ex. 1 | 0 | 130° C. | 6 h | consolidated foam state | red-brown solid | 0 | 327° C. (decomposition) | no flow | 10215 |

TABLE 2

| | Triethylamine Salt Content in Monomer (mol %/ carboxyl group) | Polymerization Temperature | Polymer State during Polymerization | Stirring State during polymerization | Torque of Stirring Motor/ N·m (value at around Mw 10000) | Molecular Weight (Mw) of Sodium Ppolyaspartate obtained |
|---|---|---|---|---|---|---|
| Ex. 10 | 30 | 120° C. | melting state | Stirring possible | 0.37 | 11654 |
| Ex. 11 | 50 | 120° C. | melting state | red-brown solid | 0.24 | 11336 |
| Ex. 12 | 75 | 120° C. | melting state | red brown solid | 0.13 | 12080 |
| Comp. Ex. 3 | 0 | 130° C. | consolidated foam state | Stirring Impossible from Starting of Polymerization | — | 9500 |

TABLE 3

| | Kind of Tertiary Amine Used | pKa Value of Conjugated Acid of Protonated Tertiary Amine Used in Water (Note, Value in Dimethylsulfoxide in DBU Case Only) | Molecular Weight (Mw) of Sodium Polyaspartate obtained |
|---|---|---|---|
| Ex. 14 | DBU | 12 | 9535 |
| Ex. 15 | Triethylamine | 10.75 | 6739 |
| Ex. 16 | DABCO | 9.1 | 5578 |
| Ex. 17 | 4-(N,N-Dimethylamino)pyridine | 9.68 | 5122 |
| Ex. 18 | Pyridine | 5.67 | 1410 |
| Comp. Ex. 4 | None | none | not polymerized |

"DBU": 1,8-Diazabicyclo[5.4.0]-7-undecene
"DABCO": Diazabicyclo[2.2.2]octane

TABLE 4

| | Polymerization Temperature | Polymerization Time | Molecular Weight (Mw) of Sodium Polyaspartate obtained | Color Phase of 5% Aqueous Solution of Sodium Polyaspartate (YI value) |
|---|---|---|---|---|
| Ex. 19 | 90° C. | 15 h | 9535 | 18 |
| Ex. 20 | 100° C. | 12 h | 10207 | 21 |
| Comp. Ex. 5 | 130° C. | 12 h | 10501 | 41 |

INDUSTRIAL APPLICABILITY

The polyaspartic acid salt produced by the present invention is useful for various purposes such as a chelating agent, a scale inhibitor, a detergent builder, a dispersing agent, and a fertilizer additive.

What is claimed is:

1. A method for producing a polyaspartic acid precursor polymer by polymerization using at least one monomer selected from the group consisting of
a product obtained from maleic anhydride and ammonia and,
maleamic acid
, wherein 15% or more of the total molar number of carboxyl groups in the monomers are a tertiary amine salt.

2. The method for producing a polyaspartic acid precursor polymer according to claim 1, wherein 30% or more of the total molar number the carboxyl groups in the monomers are the tertiary amine salt.

3. The method for producing a polyaspartic acid precursor polymer according to claim 1, wherein a tertiary amine constituting the tertiary amine salt is a compound represented by following general formula (1):

$$NR^1R^2R^3 \qquad (1)$$

wherein, in the formula, $R^1$, $R^2$, and $R^3$ are an alkyl group in which a part of hydrogen atoms may be substituted by a halogen atom, hydroxyl group, and/or an alkoxyl group with a carbon number of 1 to 3, or are an aryl group in which a part of hydrogen atoms may be substituted by an alkyl group with a carbon number of 1 to 4, an alkoxyl group with a carbon number of 1 to 3, and/or a halogen atom, and these may be identical to or different from one another; and wherein $R^1$ and $R^2$ and/or $R^2$ and $R^3$ may also be bonded to form a ring which has a tertiary nitrogen atom or a tertiary nitrogen atom and another heteroatom.

4. The method for producing a polyaspartic acid precursor polymer according to claim 1, wherein a tertiary amine is a compound in which a conjugated acid of a protonated tertiary amine indicates a pKa of 8.0 or more in water or in dimethylsulfoxide.

5. The method for producing a polyaspartic acid precursor polymer according to claim 4, wherein the tertiary amine is a trialkylamine.

6. The method for producing a polyaspartic acid precursor polymer according to claim 5, wherein the tertiary amine is a triethylamine.

7. The method for producing a polyaspartic acid precursor polymer according to claim 1, wherein water or an aprotic polar solvent is added before the polymerization reaction and/or during the polymerization reaction when the monomer is polymerized.

8. The method for producing a polyaspartic acid precursor polymer according to claim 7, wherein the molar number of the water or the aprotic polar solvent added is 10 to 300% with respect to the total molar number of the monomer to be polymerized.

9. The method for producing a polyaspartic acid precursor polymer according to claim 7, wherein the addition of the water or the aprotic polar solvent is carried out by split addition.

10. The method for producing a polyaspartic acid precursor polymer according to claim 7, wherein the water is added.

11. The polyaspartic acid precursor polymer obtained by the method according to claim 1.

12. A method for producing a polyaspartic acid salt by treating the polyaspartic acid precursor polymer obtained by the method according to claim 1 with a basic aqueous solution.

* * * * *